Figure 3:
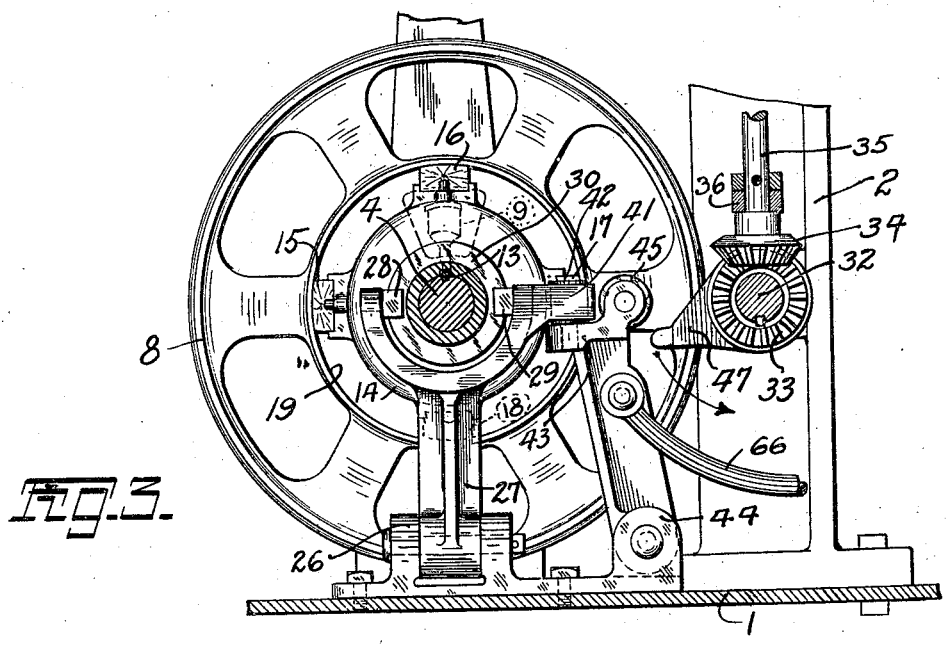

E. C. NORTHRUP.
STARTING AND STOPPING MOTION.
APPLICATION FILED MAY 28, 1915.
1,244,636.
Patented Oct. 30, 1917.
2 SHEETS—SHEET 1.
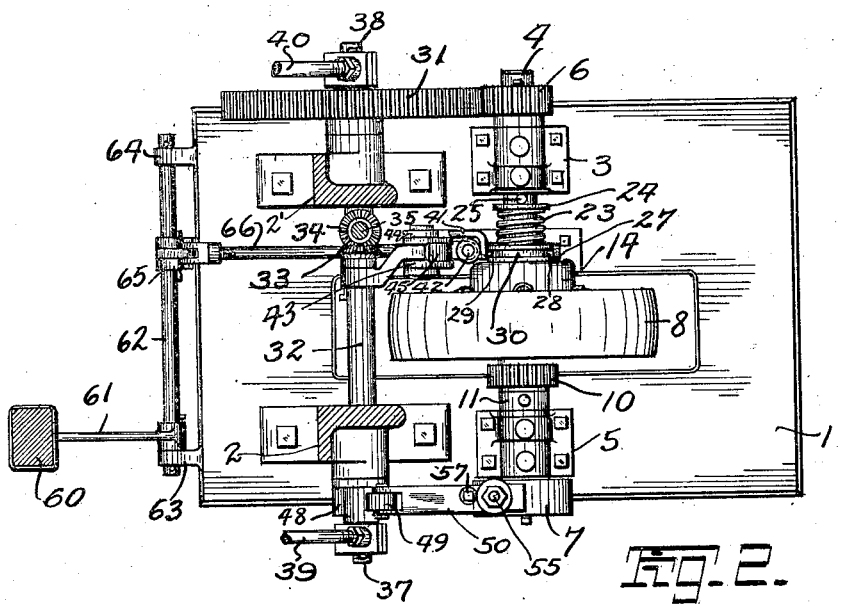
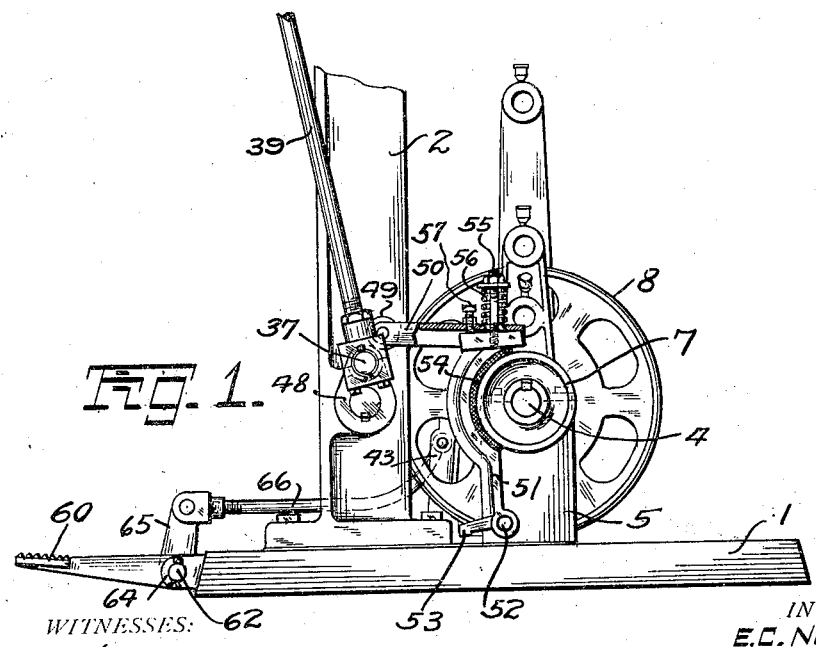
WITNESSES:
INVENTOR:
E.C. NORTHRUP.
BY Carlos P. Griffin
ATTORNEY.

E. C. NORTHRUP.
STARTING AND STOPPING MOTION.
APPLICATION FILED MAY 28, 1915.

1,244,636.

Patented Oct. 30, 1917.
2 SHEETS—SHEET 2.

WITNESSES:

INVENTOR.
E. C. NORTHRUP.
BY
Carlos P. Griffin
ATTORNEY.

UNITED STATES PATENT OFFICE.

ELMER C. NORTHRUP, OF SAN FRANCISCO, CALIFORNIA, ASSIGNOR, BY MESNE ASSIGNMENTS, TO SAVINGS UNION BANK AND TRUST COMPANY, OF SAN FRANCISCO, CALIFORNIA, A CORPORATION OF CALIFORNIA.

STARTING AND STOPPING MOTION.

1,244,636.  Specification of Letters Patent.  Patented Oct. 30, 1917.

Application filed May 28, 1915. Serial No. 30,983.

*To all whom it may concern:*

Be it known that I, ELMER C. NORTHRUP, a citizen of the United States, residing at San Francisco, in the county of San Francisco, State of California, have invented a new and useful Starting and Stopping Motion, of which the following is a specification in such full and clear terms as will enable those skilled in the art to construct and use the same.

This invention relates to a starting and stopping apparatus for machines which carry through a given set of operations intermittently, and its use in the present instance is in connection with box nailing machinery, in which a given series of nails is driven, whereupon the machine is stopped and not again set in motion until the operator places the box in position to nail another side or bottom thereon.

An object of the invention is to provide a device which will give the clutch used to start the machine a very rapid engaging throw, thereby starting the machine quickly, while it is likewise given a very rapid disengaging throw following which a brake is applied to the machine driving shaft thereby promptly bringing it to rest after the given operations have been carried out.

An embodiment of the invention is shown in the drawing in which the same reference numeral is applied to the same portion throughout, but I am aware that there may be many modifications thereof.

Figure 4:
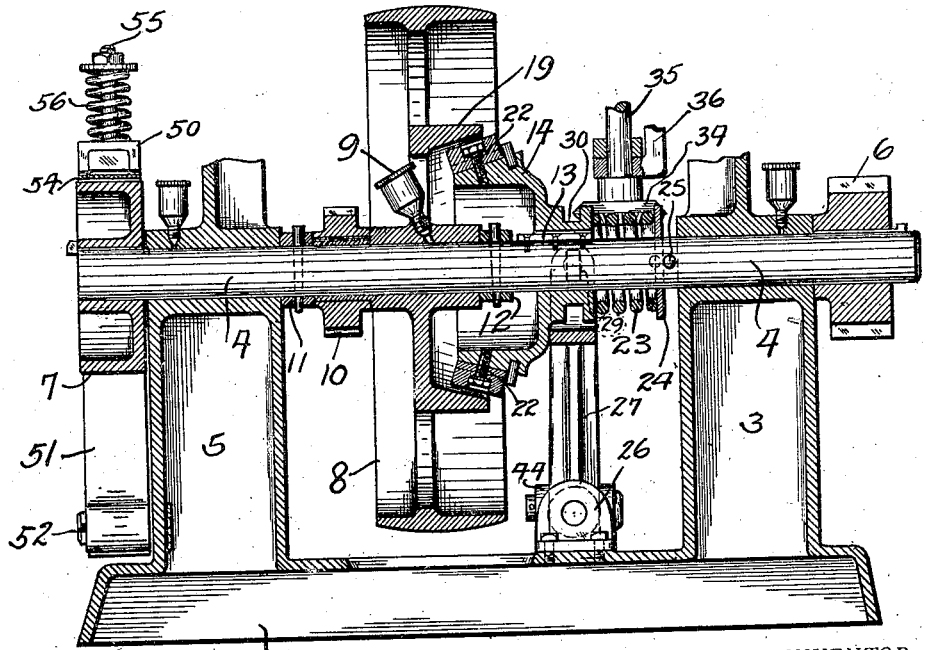

Figure 1 is a side elevation of the machine, a portion of the frame of the machine to which it may be applied being shown for purposes of illustration, Fig. 2 is a plan view of the apparatus shown in Fig. 1, Fig. 3 is a side elevation partly in section of the apparatus shown in Figs. 1 and 2, and Fig. 4 is a vertical sectional view along the center line of the clutch shaft.

The numeral 1 represents the base of the machine, 2 a portion of the frame of some machine to which this starting and stopping motion may be applied, 3 represents a standard having a bearing for the shaft 4 and 5 is a similar standard oppositely placed with respect to the standard 3 and having a bearing for the same shaft. The standards 3 and 5 are of a height to receive such other apparatus as may be convenient to use therewith, but which forms no part of the present invention.

The shaft 4 is provided with a driving pinion 6 and with a brake wheel 7. Mounted loosely on the shaft 4 is a belt pulley 8, said pulley having a suitable grease cup 9 and carrying a pinion 10 on its hub for driving any suitable apparatus which it may be desired to connect therewith continuously. The pulley 8 is held in place by means of collars 11, 12 which are suitably pinned to the shaft 4.

The shaft 4 is provided with a key 13 over which key is a slidable clutch member 14, said clutch having shoes 15, 16, 17, 18 which engage the clutch flange 19 on the pulley 8. The clutch shoes are suitably held in place on the clutch by means of bolts 22 and the clutch member 14 is held in engagement with the flange 19 by pressure from a heavy spring 23, which spring bears on a washer 24 prevented from moving longitudinally by means of the pin 25. Below the shaft 4 on the base of the machine there is a bracket 26 which forms a pivotal support for an arm 27, said arm having a fork with lugs 28, 29 which engage a groove 30 in the slidable clutch member 14, the object being to provide means whereby the clutch member may be forcibly disengaged from the pulley at the given end of the sequence of operations.

The gear 6 is in mesh with a larger gear 31 on a shaft 32 carried by journal bearings in the main standards of the machine 2 and 2'. This shaft has a bevel gear 33 thereon in mesh with a bevel gear 34 on a vertical shaft 35, a suitable bracket 36 connected with the main frame of the machine affording a support for the lower end of the shaft 35. The shaft 32 has crank pins 37, 38 connected with the links 39, 40 for the operation of the upper portion of the machine.

The arm 27 is provided with a lug 41, which lug is engaged by a roller 42 on the arm 43, said arm being pivoted on the portion 44 of the bracket 26. The arm 43 is also provided with a roller 45 which roller is so positioned as to enable the operator to pull the roller 42 out of engagement with the arm 41 thereby allowing the slidable clutch member to snap into engagement with the flange 19 to start the machine, and as soon as the machine has started the cam 47 begins to rotate with the shaft 32 and as soon as it has made one complete rotation it strikes the roller 45 and disengages the slidable clutch member from the flange 19, while at the same time the crank 48 carrying the pin 37 strikes the roller 49 on the lever 50 and thereby causes the brake arm 51 to engage the brake wheel 7 stopping the machine.

The brake comprises the lever 51 pivoted on the standard 5 at 52 and is provided with a lug 53 to prevent the brake lever from falling too far forwardly. This brake lever has a suitable friction lining 54 and the lever 50 is connected thereto by means of the bolt 55 and stiff spring 56, a set screw 57 determining the position of the lever in order to cause the brake to engage the wheel 7 at the proper time to stop it as soon as the cycle of operations of the machine has been completed.

The machine is started by the operator placing his foot upon the pedal 60, said pedal having an arm 61 rigidly connected to the shaft 62, which shaft is journaled in lugs 63, 64 extending from the front of the base of the machine. This shaft has a link 65 thereon which is pivotally connected with the link 66, said link being connected at its opposite end to the lever 43.

In operation the pulley 8 runs continuously while the machine is started by the operator depressing the foot pedal 60. This pulls the roller 42 out of engagement with the arm 41, the cam 47 being low enough to allow said roller 42 to become disengaged from the lug 41, whereupon the spring 23 forces the slidable clutch member into engagement with the flange 19 and the machine begins to turn over and will continue to turn until the cam 47 makes one complete revolution, whereupon it pushes the roller 45 out of its way and causes the disengagement of the clutch member 14 from the flange 19, and as soon as the crank 48 turns to the position shown in Fig. 1 the brake will be caused to engage the wheel 7 and the machine will be stopped, although the pulley 8 continues to rotate.

Having thus described my invention what I claim as new and desire to secure by Letters Patent of the United States, is as follows, modifications within the scope of the claims being expressly reserved:

1. A starting and stopping motion comprising a continuously running clutch member, an intermittently driven shaft, a clutch adapted to engage said member, a lever to hold said clutch member disengaged from its rotating member, manual means for moving said lever to permit the engagement of the clutch members, a cam adapted to push said lever forward to disengage the two clutch members at the end of the cycle of operations of the machine, a brake, and means whereby the intermittently driven shaft applies the brake at a predetermined point after each movement.

2. A starting and stopping motion comprising a continuously running revoluble member, an intermittently driven shaft, a slidable clutch member adapted to engage the first mentioned member, a spring to hold the clutch members in engagement, a lever to hold the clutch members out of engagement, a pedal for moving said lever out of engagement with the clutch member and permitting the clutch members to contact one with the other, a cam for causing the disengagement of the clutch members at the end of one complete revolution of the shaft carrying said cam, a brake, and means whereby the intermittently driven shaft will apply said brake at the end of one complete revolution of the cam shaft.

3. A starting and stopping motion for machines comprising a frame, an intermittently driven shaft carried thereby, a continuously running member on said shaft, a slidable clutch member, a spring to cause said slidable clutch member to engage the running member, a lever for holding the slidable clutch member out of engagement with the running clutch member, a second lever for shifting the first mentioned lever, a cam for shifting the latter lever, a shaft to which said cam is secured, a foot pedal for starting the machine, a brake for stopping the machine when the cam shaft has turned precisely one revolution and means whereby the intermittently driven shaft will apply said brake at a predetermined place after each movement.

4. A starting and stopping motion for machines comprising a frame, a shaft carried thereby, a continuously running member on said shaft, a slidable clutch member, a spring to cause said slidable clutch member to engage the running member, a lever for holding the slidable clutch member out of engagement with the running member, a second member carrying two rollers, one of which engages a projection on the first lever to hold the slidable clutch member in a given position, a revoluble shaft, a cam thereon adapted to engage the second roller to disengage the slidable clutch member, a foot pedal connected with the second member for starting the machine, and a brake for stopping it when the cam shaft has turned one revolution.

5. A starting and stopping motion for machines comprising a frame, a shaft carried thereby, a continuously running member thereon, a slidable clutch member, a spring to cause the slidable clutch member to engage the running member, a lever for shifting the slidable clutch member and having a lateral projection thereon, a second lever carrying two rollers, one to engage the latter projection to disengage the slidable clutch member from the running member, a second shaft, a cam on the latter shaft adapted to engage the second roller to cause the disengagement of the clutch members, a brake wheel, a lever pivoted to the frame, a crank on the cam shaft, and a spring pressed arm with which said crank is adapted to engage to set the brake to stop the machine after the cam shaft has turned one revolution.

In testimony whereof I have hereunto set my hand this 18th day of May, A. D. 1915, in the presence of the two subscribed witnesses.

ELMER C. NORTHRUP.

Witnesses:
C. P. GRIFFIN,
L. H. ANDERSON.

Copies of this patent may be obtained for five cents each, by addressing the "Commissioner of Patents, Washington, D. C."